(12) United States Patent
Tsai

(10) Patent No.: US 7,943,882 B2
(45) Date of Patent: May 17, 2011

(54) SEALING APPARATUS HAVING CIRCULATING CHANNEL FOR WIRE CUTTING MACHINE

(75) Inventor: Chen-Fu Tsai, Taichung (TW)

(73) Assignee: Accutex Technologies Co., Ltd., Taichung (TW)

( * ) Notice: Subject to any disclaimer, the term of this patent is extended or adjusted under 35 U.S.C. 154(b) by 712 days.

(21) Appl. No.: 11/984,580

(22) Filed: Nov. 20, 2007

(65) Prior Publication Data

US 2009/0127798 A1 May 21, 2009

(51) Int. Cl.
*B23H 7/02* (2006.01)
(52) U.S. Cl. .................... 219/69.12; 219/69.14
(58) Field of Classification Search .............. 219/69.12, 219/69.14; 277/630, 644, 641, 619, 408, 277/563, 551, 576, 577, 589; 285/139.2, 285/338, 347
See application file for complete search history.

(56) References Cited

U.S. PATENT DOCUMENTS

| 4,627,624 A * | 12/1986 | Usui et al. ................... 277/644 |
| 5,261,676 A * | 11/1993 | Rockwood ................... 277/408 |
| 6,831,245 B1 * | 12/2004 | Koba et al. ................. 219/69.12 |
| 2006/0237915 A1 * | 10/2006 | Kita et al. .................. 219/69.12 |
| 2008/0217861 A1 * | 9/2008 | Sei ................................ 277/408 |
| 2009/0140495 A1 * | 6/2009 | Dreifert et al. ............... 277/431 |

FOREIGN PATENT DOCUMENTS

| JP | 11-138351 A * | 5/1999 |
| JP | 2006-35370 A * | 2/2006 |

* cited by examiner

*Primary Examiner* — Geoffrey S Evans
(74) *Attorney, Agent, or Firm* — Wang Law Firm, Inc.; Li K. Wang

(57) ABSTRACT

A sealing apparatus comprises a circulating channel for a wire cutting machine, and the sealing apparatus further includes a channel at the position of a lower arm in the fluid tank for injecting a liquid, and a sealing O-ring installed at the sealing apparatus for preventing a leak of liquid, such that a circulating channel is formed around the periphery of the lower arm. The liquid is injected through an injecting inlet into the circulating channel such that the centrifugal force produced by the whirling flow can wash away the debrises attached on the lower arm, and discharge the debrises from a discharge opening to the outside.

3 Claims, 6 Drawing Sheets

SEALING APPARATUS HAVING CIRCULATING CHANNEL FOR WIRE CUTTING MACHINE

BACKGROUND OF THE INVENTION

1. Field of the Invention

The present invention relates to a sealing apparatus having a circulating channel for a wire cutting machine, and more particularly to a sealing apparatus of a wire cutting machine that uses a convection to remove debrises attached onto a surface.

2. Description of the Related Art

The present existing wire cutting technology refers to a high-precision linear motor driving system operated with an electric discharge module of a wire cutting machine to provide an application of a wire cutting electric discharge manufacturing.

In an electric discharge manufacturing process, manufacturers generally require using a manufacturing liquid as an electric discharge medium and a dipping method for a high-precision cutting manufacture of a workpiece.

A conventional wire cutting machine generally stores the manufacturing liquid in a fluid tank, and the fluid tank is built and passed through a tank wall by a lower arm for the manufacturing operation of a workpiece by a metal wire dipped in the manufacturing liquid.

Since the lower arm is dipped into the manufacturing liquid, the working debrises produced by cutting the workpiece remain in the manufacturing liquid and attach onto a surface of the lower arm.

The fluid tank may have an axial displacement with respect to the lower arm. If there is any working debris attached to a surface, the axial movement will be affected greatly. Further, a sealing member is installed between the lower arm and a wall of the fluid tank, and the working debrises may ruin the seal, and thus there may be a risk of leaking the manufacturing liquid. Obviously, improvements are required.

SUMMARY OF THE INVENTION

It is a primary objective of the present invention to overcome the aforementioned shortcoming by providing a sealing apparatus having a circulating channel for a wire cutting machine, wherein a seal ring and a seal ring cover are engaged at a lower arm to form a circulating channel, and a fluid is injected into the circulating channel to remove the working debrises attached on the lower arm.

A secondary objective of the present invention is to provide a wire cutting machine having a structure that can brush and wash away debrises attached on the surface of a lower arm.

To achieve the foregoing objectives, the present invention provides a sealing apparatus having a circulating channel for a wire cutting machine, comprising:

a seal ring cover, sheathed to the lower arm, and divided into an external ring section, a channel section, and a first fixing section according to the respective internal diameters, and the channel section being interconnected with at least one discharge opening by at least one injecting inlet, for injecting a liquid from each injecting inlet, and discharging the liquid from each discharge opening to define a circulating channel;

a sealing O-ring, sheathed to a first fixing section between the lower arm and the seal ring cover, and pressed by the lower arm, for preventing a leak of a manufacturing liquid in the fluid tank; and a seal ring, sheathed to the lower arm, and having a second fixing section and an engaging section, and the seal ring being fixed to the sealing O-ring by the second fixing section, and the engaging section having a groove, and the groove installing a wear plate for pressing at the lower arm.

DETAILED DESCRIPTION OF THE PREFERRED EMBODIMENTS

Figure 1:
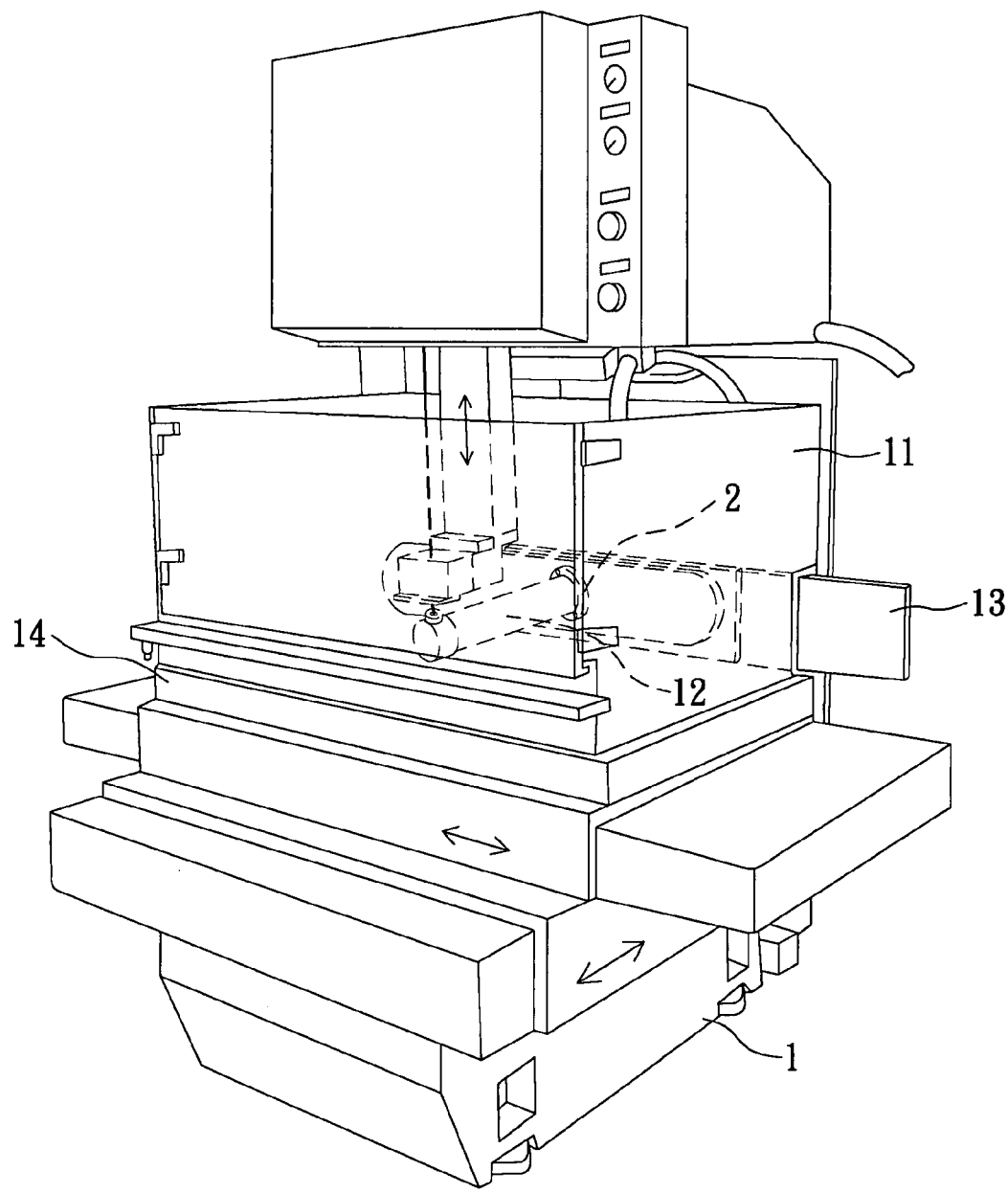
FIG. 1 is a schematic view of a wire cutting machine of the present invention.
Figure 2:
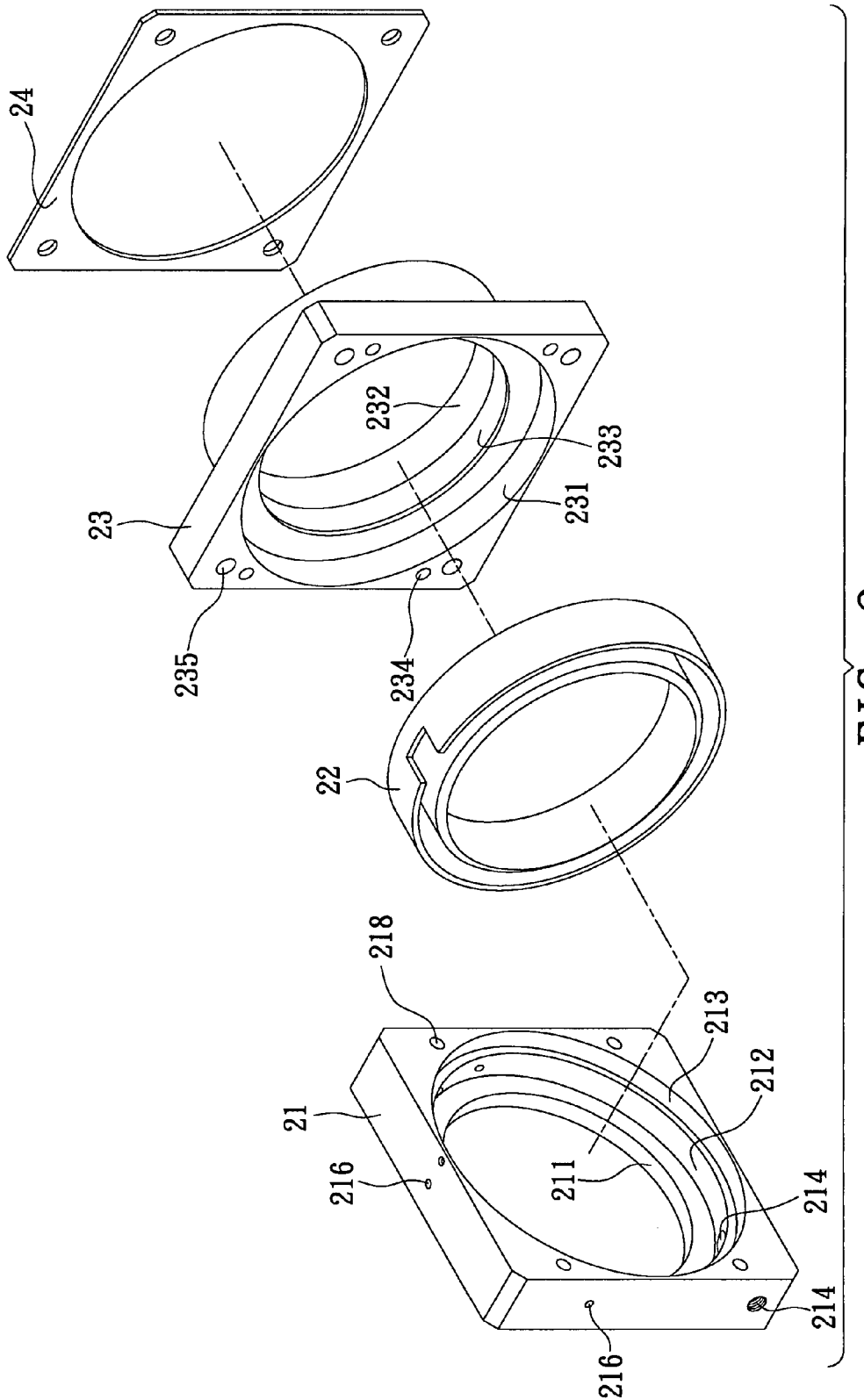
FIG. 2 is a schematic view of assembling a sealing apparatus of the present invention.
Figure 3:
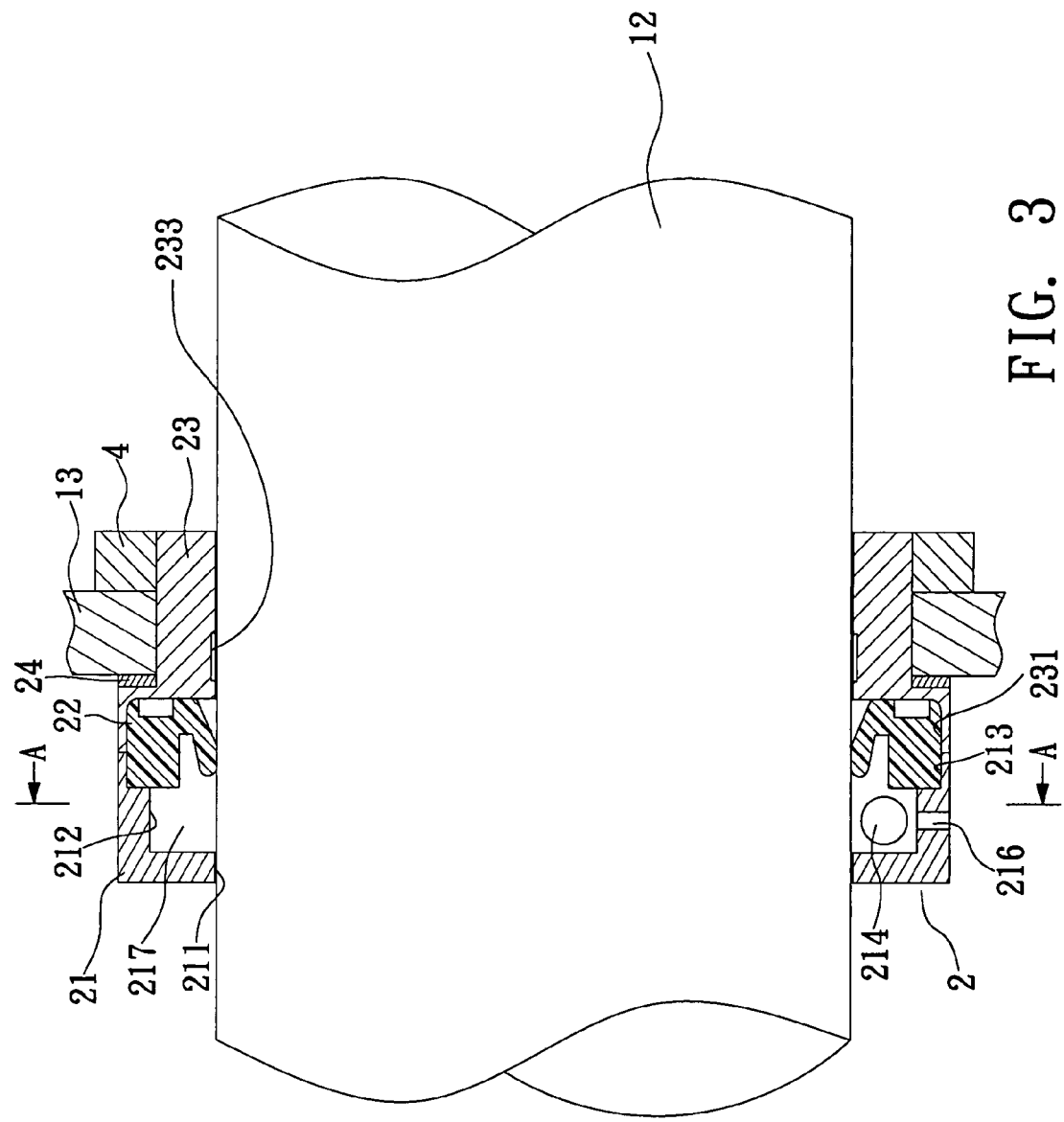
FIG. 3 is a sectional view of assembling a sealing apparatus and a lower arm of the present invention.

Referring to FIGS. 1 to 4 for an assembly of a first preferred embodiment of the present invention, the preferred embodiment is used for illustration purpose only, but not intended to limit the scope of the invention.

This embodiment provides a sealing apparatus having a circulating channel for a wire cutting machine, and the sealing apparatus is installed between a fluid tank 11 on a working platform 14 of a wire cutting machine casing 1 and a lower arm 12 operated in the fluid tank 11, and the sealing apparatus 2 is sheathed to the lower arm 12 and fixed to a water baffle board 13 at a rear side of the fluid tank 11. The sealing apparatus 2 comprises:

a seal ring cover 21, divided into an external ring section 211, a channel section 212, and a first fixing section 213 according to the respective internal diameters, and the channel section 212 being interconnected with at least one discharge opening 216 by a first injecting inlet 214 and a second injecting inlet 215, and a liquid being injected from the first injecting inlet 214 and the second injecting inlet 215, and discharged from each discharge opening 216 to define a circulating channel 217;

a sealing O-ring 22, sheathed to a first fixing section 213 between the lower arm 12 and the seal ring cover 21, and pressed by the lower arm 12, for preventing a leak of a manufacturing liquid in the fluid tank 11; and a seal ring 23, sheathed to the lower arm 12, and having a second fixing section 231 and an engaging section 232, and the seal ring 23 being fixed to the sealing O-ring 22 by the second fixing section 231, and the engaging section 232 installing a wear plate 233 for pressing the lower arm 12 to prevent the engaging section 232 from being worn or damaged directly at the lower arm 12.

However, the seal ring 23 and a clamp plate 4 are clamped at the water baffle board 13, and a fixing hole 235 is used for locking the water baffle board 13, and a rubber gasket 24 is installed between the seal ring 23 and the water baffle board 13 for enhancing the anti-leak effect of the water baffle board 13 and improving the degree of sealing the seal ring 23 and the water baffle board 13.

In addition, the seal ring 23 is fixed in order to connect the seal ring cover 21 and the seal ring 23, and the connecting method uses a locking hole 218 of the seal ring cover 21 and a locking hole 234 of the seal ring 23 to secure a screw for the connection. When the sealing O-ring 22 is installed to the seal ring 23 and the seal ring cover 21, the sealing O-ring 22 should be installed between the first fixing section 213 and the second fixing section 231 to prevent a leak of the manufacturing liquid and a circulating liquid in the channel section 212 of the seal ring cover 21.

Figure 4:
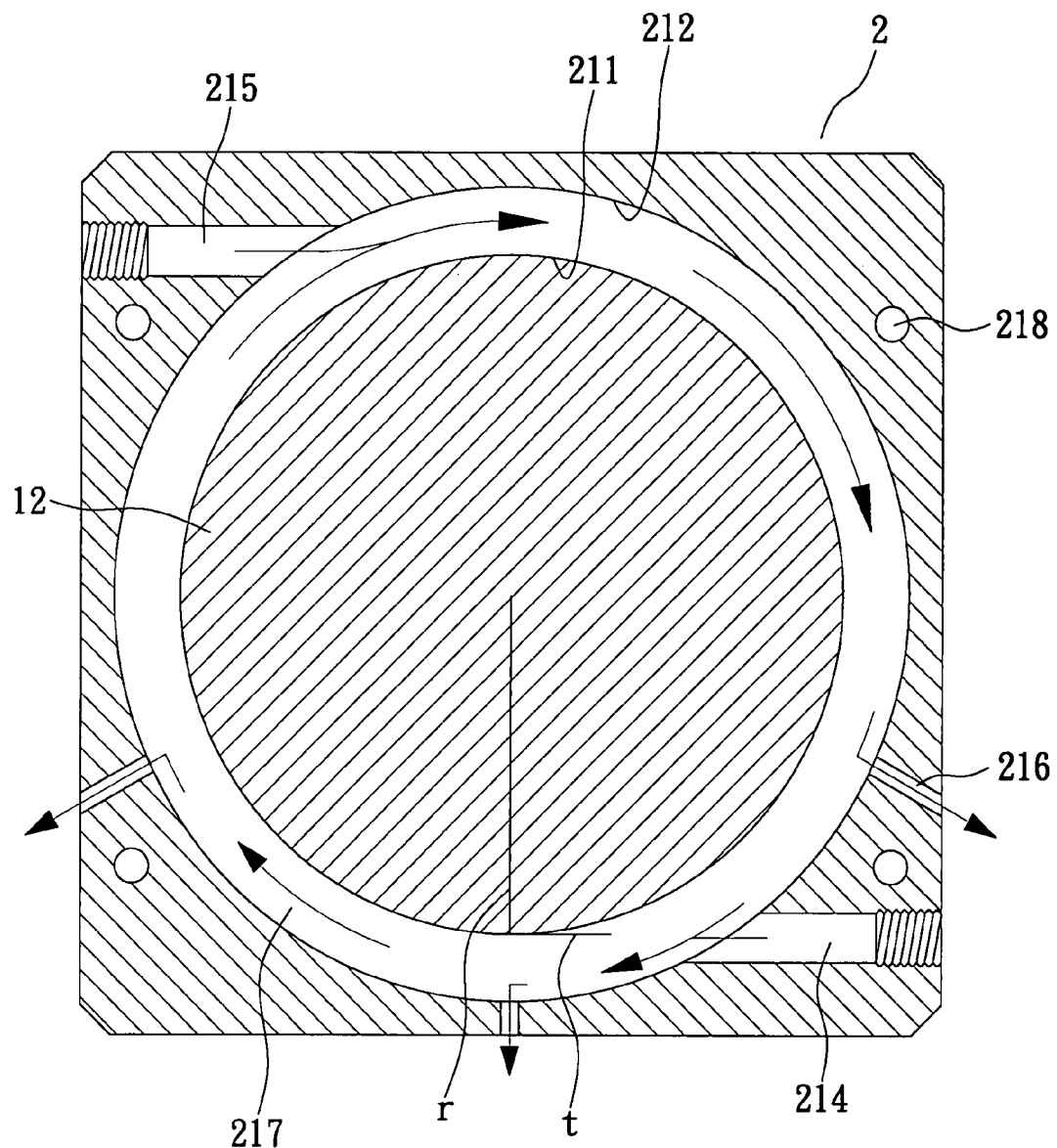
FIG. 4 is an enlarged view of section A-A of FIG. 3, wherein the arrow indicates the fluid circulation and discharge directions of the present invention.

In the sealing apparatus 2 comprised of the aforementioned elements, the movement of the liquid circulation in the channel section 212 is shown in FIG. 4, and the fluid is injected from the first injecting inlet 214 and the second injecting inlet 215 into the circulating channel 217, and the fluid circulates in the arrowed direction as shown in the figure according to the circular wall of the channel section 212. Since the circulating direction of injecting the fluid from the first injecting inlet 214 and the second injecting inlet 215 is the same as the direction of any tangent t at the circumference of the lower arm 12, and the tangent t is perpendicular to the radius r of the lower arm 12, therefore a whirl formed by the fluid will produce a stronger washing effect to the circumferential surface, and the debrises attached on the lower arm 12 will be discharged together with the fluid from the discharge opening 216 to the outside.

Therefore, the installation of a sealing apparatus having a circulating channel to the lower arm of the wire cutting machine has the following advantages:

1. The working debrises attached on a surface of the lower arm are removed by a washing procedure to achieve a better cleaning effect than the prior art.

2. When the fluid tank moves with the working platform, the sealing apparatus gives a better sealing effect to the lower arm, and provides a better anti-leak effect than the prior art.

Figure 5:
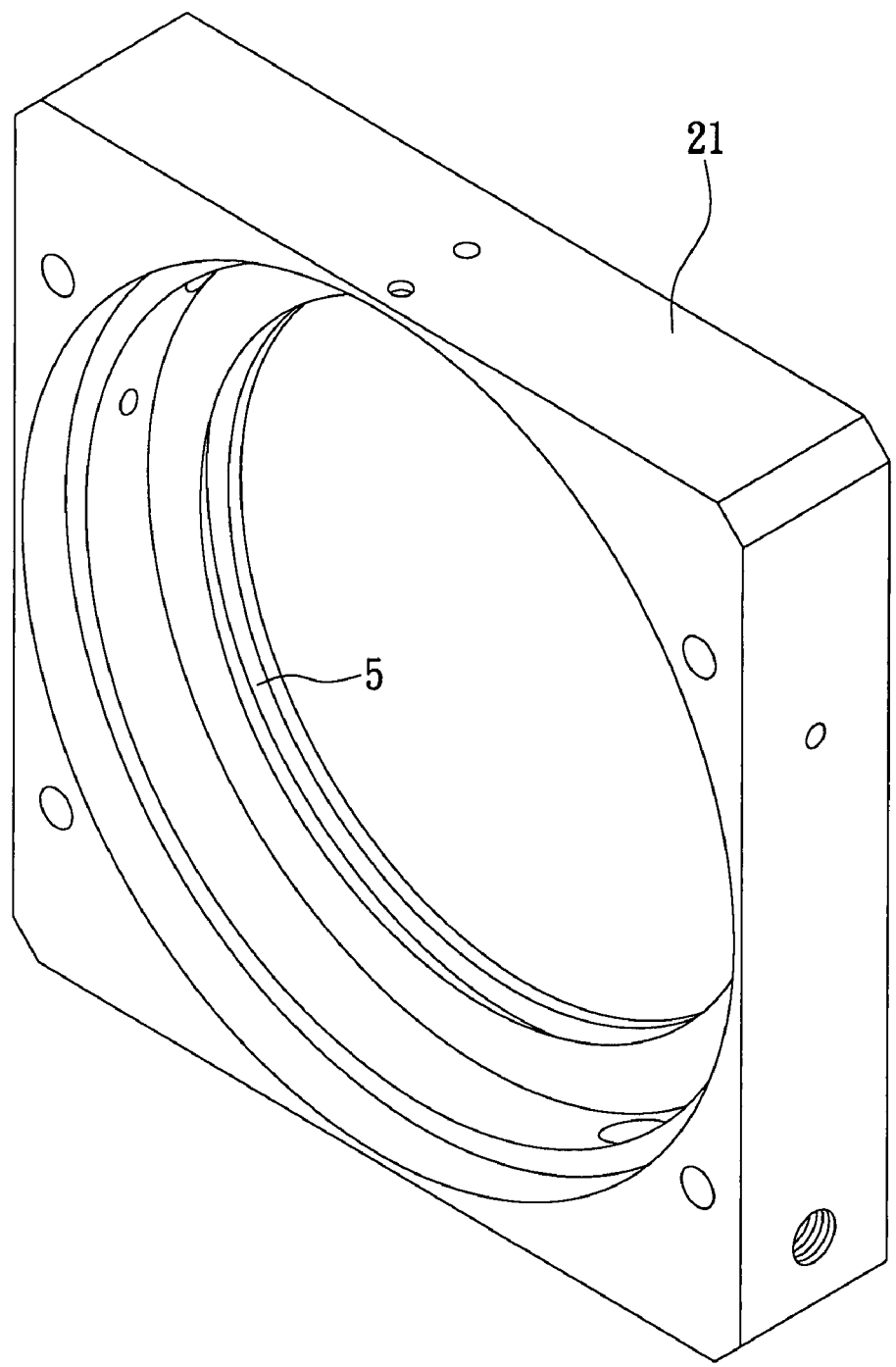
FIG. 5 is a perspective view of a sealing apparatus in accordance with another preferred embodiment of the present invention.
Figure 6:
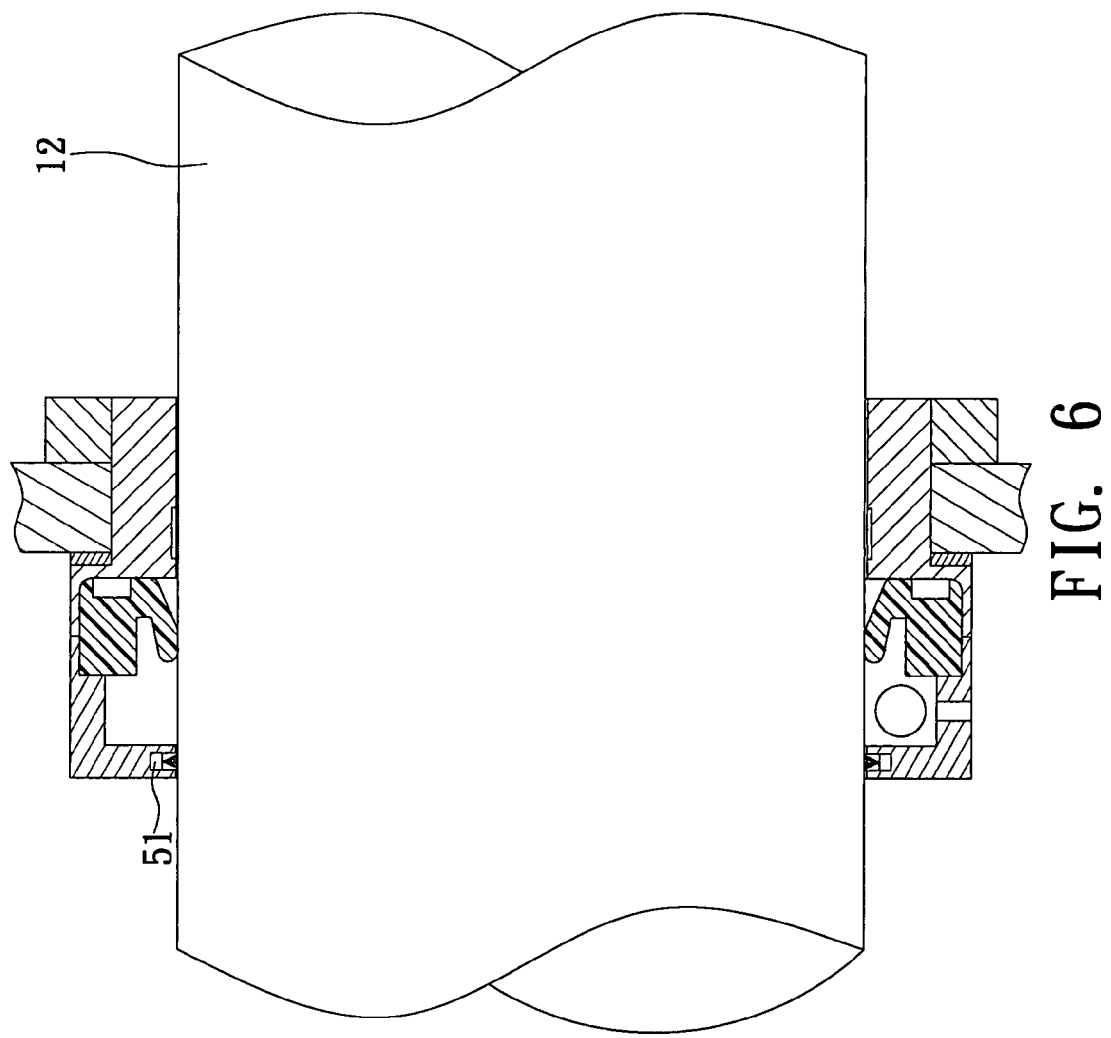
FIG. 6 is a sectional view of assembling a sealing apparatus and a lower arm as depicted in FIG. 5.

Of course, the present invention may have many other embodiments, but only minor changes are involved. Referring to FIG. 5 for a second preferred embodiment of the present invention, the difference of this embodiment from the first preferred embodiment resides on that the external ring section 211 includes a circular concave space that serves as a containing groove 5. The containing groove 5 further includes a brush 51 as shown in FIG. 6, such that the debrises attached on a surface of the lower arm 12 can be brushed or scraped during the movement period of the water baffle board 3 that links the sealing apparatus 2.

What is claimed is:

1. A sealing apparatus having a circulating channel for a wire cutting machine, and the sealing apparatus being installed between a fluid tank of the wire cutting machine and a lower arm operated in the fluid tank, and sheathed to the lower arm and fixed to a water baffle board at a rear side of the fluid tank, and the sealing apparatus comprising:

a seal ring cover, divided into an external ring section, a channel section, and a first fixing section according to the respective internal diameters, and the channel section being interconnected with at least one discharge opening by at least one injecting inlet, and a liquid being injected from each injecting inlet and discharged from each discharge opening to define a circulating channel;

a sealing O-ring, sheathed to a first fixing section between the lower arm and the seal ring cover, and pressed by the lower arm, for preventing a leak of manufacturing liquid in the fluid tank; and a seal ring, sheathed to the lower arm, and having a second fixing section and an engaging section, and the seal ring being fixed to the sealing O-ring by the second fixing section, and the engaging section installing a wear plate for pressing at the lower arm.

2. The sealing apparatus having a circulating channel for a wire cutting machine as recited in claim 1, further comprising a rubber gasket installed between the sealing apparatus and the water baffle board.

3. The sealing apparatus having a circulating channel for a wire cutting machine as recited in claim 1, wherein the external ring section includes a containing groove, for installing a brush to remove debrises attached on a surface of the lower arm.

* * * * *